US010026964B2

(12) United States Patent
Nomura et al.

(10) Patent No.: US 10,026,964 B2
(45) Date of Patent: Jul. 17, 2018

(54) POSITIVE ELECTRODE FOR RECHARGEABLE LITHIUM BATTERY, AND WINDING ELEMENT RECHARGEABLE LITHIUM BATTERY

(71) Applicant: SAMSUNG SDI CO., LTD., Yongin-si, Gyeonggi-do (KR)

(72) Inventors: Keisuke Nomura, Yokohama (JP); Hironobu Fukahori, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 82 days.

(21) Appl. No.: 14/981,594

(22) Filed: Dec. 28, 2015

(65) Prior Publication Data

US 2016/0190593 A1      Jun. 30, 2016

(30) Foreign Application Priority Data

Dec. 26, 2014   (JP) .................................. 2014-264984
Nov. 13, 2015   (KR) ........................ 10-2015-0159984

(51) Int. Cl.
  *H01M 4/62*       (2006.01)
  *H01M 4/485*      (2010.01)
  (Continued)

(52) U.S. Cl.
  CPC ........... *H01M 4/622* (2013.01); *H01M 4/131* (2013.01); *H01M 4/1391* (2013.01); *H01M 10/0525* (2013.01)

(58) Field of Classification Search
  CPC .... H01M 4/622; H01M 4/1391; H01M 4/131; H01M 4/366; H01M 4/621; H01M 4/623; H01M 10/0525; H01M 10/0587; H01M 10/0583; H01M 2004/021; H01M 2004/028
  See application file for complete search history.

(56) References Cited

U.S. PATENT DOCUMENTS

| 2009/0194747 | A1* | 8/2009 | Zou ....................... | H01M 4/131 |
| | | | | 252/519.33 |
| 2011/0223456 | A1* | 9/2011 | Sugaya ................... | H01M 4/13 |
| | | | | 429/94 |

FOREIGN PATENT DOCUMENTS

| JP | 11-126599 A | 5/1999 |
| JP | 2012-146590 A | 8/2012 |
| JP | 2014-35886 A | 2/2014 |

OTHER PUBLICATIONS

Abstract and Machine English Translation of Japanese Patent Publication No. 11-126599 A, May 11, 1999, 14 Pages.
(Continued)

*Primary Examiner* — Ula C Ruddock
*Assistant Examiner* — Matthew W Van Oudenaren
(74) *Attorney, Agent, or Firm* — Lewis Roca Rothgerber Christie LLP

(57) ABSTRACT

A positive electrode for a rechargeable lithium battery includes a positive current collector; a high elastic modulus layer on the positive current collector and including a first positive active material and a high elastic modulus binder; and a low elastic modulus layer on the high elastic modulus layer and including a second positive active material and a low elastic modulus binder, wherein the low elastic modulus binder has a lower tensile modulus than the high elastic modulus binder. A winding element includes the positive electrode. A rechargeable lithium battery includes the winding element.

7 Claims, 1 Drawing Sheet

(51) Int. Cl.
*H01M 10/04* (2006.01)
*H01M 10/0525* (2010.01)
*H01M 4/131* (2010.01)
*H01M 4/1391* (2010.01)

(56) References Cited

OTHER PUBLICATIONS

Abstract and Machine English Translation of Japanese Patent Publication No. 2012-146590 A, Aug. 2, 2012, 18 Pages.
Abstract and Machine English Translation of Japanese Patent Publication No. 2014-35886 A, Feb. 24, 2014, 22 Pages.

* cited by examiner

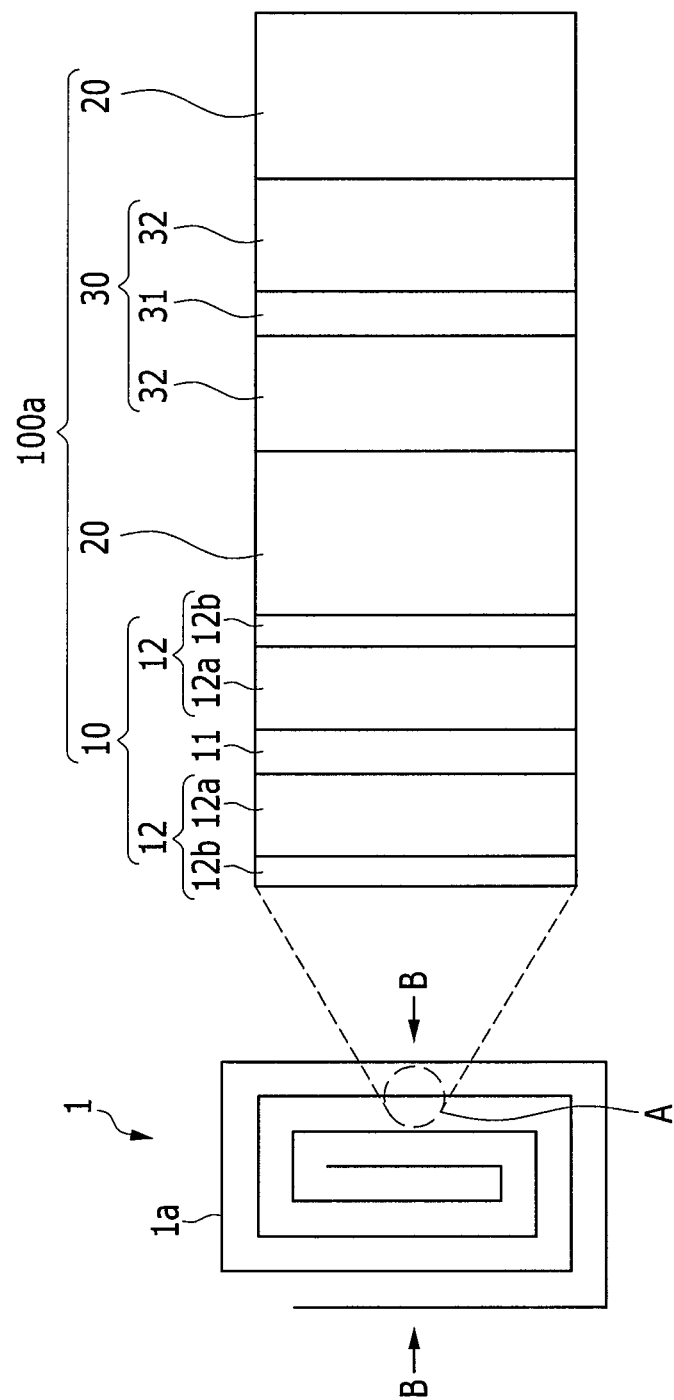

POSITIVE ELECTRODE FOR RECHARGEABLE LITHIUM BATTERY, AND WINDING ELEMENT RECHARGEABLE LITHIUM BATTERY

CROSS-REFERENCE TO RELATED APPLICATIONS

This application claims priority to and the benefit of Japanese Patent Application No. 2014-264984 filed in the Japan Patent Office on Dec. 26, 2014, and Korean Patent Application No. 10-2015-0159984 filed in the Korean Intellectual Property Office on Nov. 13, 2015, the entire contents of each of which are incorporated herein by reference.

BACKGROUND

1. Field

A positive electrode for a rechargeable lithium battery, a winding element, and a rechargeable lithium battery are disclosed.

2. Description of the Related Art

As information-processing devices such as a mobile phone, a laptop, and the like has recently been down-sized, there is a demand for newly improving characteristics of a rechargeable lithium ion battery as a power source for the information-processing device.

For example, certain technologies improve capacity and cycle characteristics of a rechargeable lithium ion battery by making a positive active material layer having high density. For example, two or more kinds (e.g., more than two kinds) of active material particles having different average particle diameters may be mixed in a predetermined ratio, and simultaneously, carbon black and expanded graphite may be mixed in a predetermined ratio. However, the positive active material layer having high density may not sufficiently improve the characteristics of the rechargeable lithium ion battery.

Accordingly, a technology of making the positive active material layer thicker as well as concurrently (e.g., simultaneously) having high density is suggested. However, when the positive active material layer is made to be thicker after being made to have high density, flexibility of the positive active material layer is deteriorated. Accordingly, damage to the positive electrode may occur when the positive electrode is wound to manufacture a rechargeable lithium ion battery, thereby limiting the thickness of the positive active material layer.

On the other hand, the flexibility of the positive active material layer may be secured by using a low elastic modulus binder, but the low elastic modulus binder may deteriorate cycle characteristics of the rechargeable lithium ion battery. Accordingly, the low elastic modulus binder may be used to make the positive active material layer thicker but hardly improves other characteristics of the rechargeable lithium ion battery.

SUMMARY

One embodiment provides a positive electrode for a rechargeable lithium battery being capable of heightening (e.g., improving) flexibility of a positive active material layer while maintaining cycle-life characteristics of a rechargeable lithium battery.

An embodiment provides a winding element including the positive electrode layer.

An embodiment provides a rechargeable lithium battery including the winding element.

One embodiment provides a positive electrode for a rechargeable lithium battery that includes a positive current collector; a high elastic modulus layer on the positive current collector and including a first positive active material and a high elastic modulus binder; and a low elastic modulus layer on the high elastic modulus layer and including a second positive active material and a low elastic modulus binder, wherein the low elastic modulus binder has a lower tensile modulus than the high elastic modulus binder.

The high elastic modulus binder may have a tensile modulus of about 400 MPa to about 1200 MPa, and the low elastic modulus binder may have a tensile modulus of about 150 MPa to about 700 MPa.

At least one selected from the high elastic modulus binder and the low elastic modulus binder may include a copolymer.

At least one selected from the first positive active material and the second positive active material may include a lithium transition metal oxide.

An embodiment provides a winding element including the positive electrode.

An embodiment provides a rechargeable lithium battery including the winding element.

Other embodiments are included in the following detailed description.

The rechargeable lithium battery heightens flexibility of a positive active material layer while maintaining cycle characteristics.

BRIEF DESCRIPTION OF THE DRAWING

The accompanying drawing, together with the specification, illustrates embodiments of the subject matter of the present disclosure, and, together with the description, serves to explain principles of embodiments of the subject matter of the present disclosure. The accompanying drawing is a top cross-sectional view showing a schematic structure of a rechargeable lithium battery according to one embodiment

DETAILED DESCRIPTION

Hereinafter, embodiments are described in more detail. However, these embodiments are exemplary, the present disclosure is not limited thereto and the subject matter of the present disclosure is defined by the scope of the appended claims and equivalents thereof.

As used herein, when specific definition is not otherwise provided, It will be understood that when an element such as a layer, film, region, or substrate is referred to as being "on" another element, it can be directly on the other element or intervening elements may also be present.

Hereinafter, a rechargeable lithium battery according to one embodiment is described referring to the accompanying drawing.

The accompanying drawing is a top cross-sectional view showing a schematic structure of a rechargeable lithium battery 1 according to one embodiment The rechargeable lithium battery 1 includes a winding element 1a, a non-aqueous electrolyte, and an exterior material.

The winding element 1a is obtained by winding the electrode stack structure 100a obtained by sequentially stacking a belt-shaped positive electrode 10, separator 20, a belt-shaped negative electrode 30 and separator 20 in a length direction and compressing the wound electrode stack structure in an arrow direction B (e.g., in the directions indicated by the arrows B in the accompanying drawing).

The belt-shaped positive electrode 10 (hereinafter, a "positive electrode 10") may include a positive current collector 11 and a positive active material layer 12 disposed on the positive current collector.

The positive current collector 11 is not particularly limited, and may be, for example aluminum (Al), stainless steel, nickel-plated steel, and/or the like.

The positive current collector 11 may be connected (e.g., coupled) with a positive terminal.

The positive active material layer 12 may include a high elastic modulus layer 12a and a low elastic modulus layer 12b.

The high elastic modulus layer 12a may be disposed on the positive current collector 11, and, in some embodiments, the high elastic modulus layer 12a is on both sides of the positive current collector 11.

The high elastic modulus layer 12a may have a higher tensile modulus than the low elastic modulus layer 12b. In other words, for example, the high elastic modulus layer 12a may be harder (e.g., have a higher hardness) than the low elastic modulus layer 12b.

In this way, an embodiment of the positive active material layer 12 is designed to have a two-layered structure so that a surface layer of the positive active material layer 12 (e.g., a layer of the positive active material layer 12 that is at a farther side from the positive current collector 11) may be softened. When the positive electrode 10 is bent, the positive electrode 10 may be easily distorted at the surface layer. Without being limited by any particular mechanism or theory, it is believed that the reason that the positive electrode may be easily distorted at the surface layer is that a large stress may be applied toward the surface layer of the positive electrode 10 during the bending. In one embodiment, the distortion may be suppressed or reduced by positioning a soft layer at or on the surface layer of the positive electrode 10.

Hereinafter, the layers of the positive active material layer 12 are illustrated in more detail.

The high elastic modulus layer 12a may include a first positive active material and a high elastic modulus binder, and may further include a conductive material.

The first positive active material may include any suitable material capable of reversibly intercalating and deintercalating lithium ions without any particular limit such as, for example, a lithium-containing transition metal oxide, nickel sulfide, copper sulfide, sulfur, iron oxide, vanadium oxide, and/or the like.

Examples of the lithium-containing transition metal oxide may include lithium cobalt oxide, lithium nickel oxide, lithium nickel cobalt oxide, lithium nickel cobalt aluminum oxide, lithium nickel cobalt manganese oxide, lithium manganese oxide, lithium iron phosphate, and the like. These positive active materials may be used alone or as a mixture of two or more (e.g., more than two).

The first positive active material may be the lithium-containing transition metal oxide, for example, a lithium-containing transition metal oxide having a layered rock salt structure.

The lithium-containing transition metal oxide having the layered rock salt structure may be may be, for example, a lithium salt of a ternary transition metal oxide represented by $Li_{1-x-y-z}Ni_xCo_yAl_zO_2$ (NCA) or $Li_{1-x-y-z}Ni_xCo_yMn_zO_2$ (NCM) (wherein, $0<x<1$, $0<y<1$, $0<z<1$, and $x+y+z<1$).

In some embodiments, the first positive active material may suppress or reduce a side reaction with an electrolyte during or at a high voltage by surface-treating the above materials.

The first positive active material may have an average agglomerated particle diameter of about 10 μm to about 30 μm. For example the positive active material have the foregoing average agglomerated particle diameter may provide suitable safety and/or charge property. As used herein, the average agglomerated particle diameter of the first positive active material is a 50% cumulative value (D50) in a diameter distribution when a secondary particle formed through agglomeration of primary particles of the first positive active material is regarded to be spherical and may be measured in a laser diffraction scattering method.

The first positive active material in the high elastic modulus layer 12a may be used in any suitable amount, for example, any suitable volume density without a particular limit except for an amount utilized in the art for a positive active material layer for rechargeable lithium batteries.

The high elastic modulus binder may bond a first positive active material and a conductive material themselves (e.g., together) and concurrently (e.g., simultaneously), bond the first positive active material and the conductive material with the positive current collector 11.

The high elastic modulus binder may have a higher tensile modulus than the low elastic modulus binder.

The high elastic modulus binder may be polyvinylidene fluoride, a modified product of polyvinylidene fluoride, a vinylidenefluoride-tetrafluoroethylene copolymer, a vinylidenefluoride-tetrafluoroethylene-hexafluoropropylene copolymer, a vinylidenefluoride-hexafluoropropylene copolymer, a modified product of vinylidenefluoride-hexafluoropropylene copolymer, an ethylene acrylic acid copolymer, an ethylene methylacrylate copolymer, a vinylidenefluoride-acrylate copolymer, an acrylonitrile butadiene rubber, a hydrogenated acylonitrile-butadiene copolymer, a hydrogenated nitrile-butadiene rubber (H-NBR), and/or the like. These binders may be used alone or as a mixture of two or more (e.g., more than two).

When a homopolymer is used as the high elastic modulus binder, the tensile modulus of the high elastic modulus binder may be adjusted utilizing various suitable methods such as, for example, a method of adjusting the weight average molecular weight of the homopolymer, without limitation. When the weight average molecular weight of the homopolymer is adjusted, the weight average molecular weight may be about 200,000 to about 1,000,000.

When a copolymer is used as the high elastic modulus binder, the tensile modulus of the copolymer may be adjusted by controlling a composition ratio (e.g., a mole ratio and/or the like) among monomers comprising the copolymer (e.g., monomers that form the copolymer). For example, the tensile modulus of the copolymer may be increased by increasing a composition ratio among monomers comprising a polymer having a high tensile modulus (e.g., monomers that form the polymer having a high tensile modulus). As for the high elastic modulus binder, in some embodiments, at least one copolymer may be used. For example, the copolymer may include for example about 1 mol to about 50 moles of tetrafluoroethylene, hexafluoropropylene, and/or the like based on 100 moles of the total (e.g., entire) moles of the copolymer by increasing the composition ratio of monomers having a relatively high tensile modulus among polymers of the high elastic modulus binder: The copolymer may have a weight average molecular weight of about 200,000 to about 1,000,000.

The high elastic modulus binder may have a higher tensile modulus than the low elastic modulus binder without a particular limit. In some embodiments, the tensile modulus of the high elastic modulus binder may be, for example, about 400 MPa to about 1200 MPa, for example, about 500 MPa to about 900 MPa. When the high elastic modulus binder has a tensile modulus within the range, the positive electrode 10 may realize high capacity as well as secure flexibility. The tensile modulus may be measured, for example, through a tensile test such as, for example, ASTM D638.

The high elastic modulus binder may be used without a particular limit. In some embodiments, the high elastic modulus binder may be included in the high elastic modulus layer 12a in an amount of about 0.3 wt % to about 7 wt %, for example, about 0.5 wt % to about 3 wt % based on the total amount of the high elastic modulus layer 12a. When the high elastic modulus binder is used within the range, close contacting property with a positive current collector may be improved, and charge property of an electrode may be improved.

The conductive material may be, for example, carbon black (such as, for example, ketjen black, acetylene black and/or the like), natural graphite, artificial graphite, and/or the like but has no particular limit if conductivity of a positive electrode is increased by including the conductive material.

The low elastic modulus layer 12b may be formed on a surface of the high elastic modulus layer 12a.

The low elastic modulus layer 12b may include a second positive active material and a low elastic modulus binder, and may further include a conductive material.

The second positive active material may be the same as the first positive active material.

The first positive active material and the second positive active material may be the same material or different materials from each other.

A content of the second positive active material of the low elastic modulus layer 12b may be the same as a content of the first positive active material.

The conductive material included in the low elastic modulus layer 12b may be the same as the conductive material included in the high elastic modulus layer 12a.

The low elastic modulus binder may bond a second positive active material and a conductive material themselves (e.g., together) and concurrently (e.g., simultaneously), bond the second positive active material and the conductive material with the high elastic modulus layer 12a.

The low elastic modulus binder may have a lower tensile modulus than the high elastic modulus binder.

The low elastic modulus binder may include polyvinylidene fluoride, a modified product of polyvinylidene fluoride, a vinylidenefluoride-tetrafluoroethylene copolymer, a vinylidenefluoride-tetrafluoroethylene-hexafluoropropylene copolymer, a vinylidenefluoride-hexafluoropropylene copolymer, a modified product of a vinylidenefluoride-hexafluoropropylene copolymer, an ethylene acrylic acid copolymer, an ethylene methylacrylate copolymer, a vinylidenefluoride-acrylate copolymer, acrylonitrile butadiene rubber, a hydrogenated acrylonitrile butadiene copolymer, a hydrogenated nitrile-butadiene rubber (H-NBR), and/or the like. These binders may be used alone or as a mixture of two or more (e.g., more than two). The low elastic modulus binder may include any of the foregoing materials and have a lower tensile modulus than the high elastic modulus binder.

When a copolymer is used as the low elastic modulus binder, the tensile modulus of the copolymer may be adjusted by controlling the composition ratio (e.g., a mole ratio and/or the like) of monomers comprising the copolymer (e.g., monomers that form the copolymer). For example, the tensile modulus of the copolymer may be decreased by increasing the composition ratio of monomers comprising a polymer having a low tensile modulus (e.g., monomers that form the polymer having a low tensile modulus). As for the low elastic modulus binder, in some embodiments, at least one copolymer may be used.

The low elastic modulus binder may have any suitable tensile modulus lower than that of the high elastic modulus binder without a particular limit. For example, the low elastic modulus binder may have a tensile modulus of about 150 MPa to about 700 MPa, for example, about 200 MPa to about 500 MPa. When the low elastic modulus binder has a tensile modulus within the range, the positive electrode 10 may realize high capacity as well as secure flexibility. The tensile modulus is, for example, measured through a tensile test such as, for example, ASTM D638.

The low elastic modulus binder may be used without a particular limit. In some embodiments, the low elastic modulus binder may be included in the low elastic modulus layer 12b in an amount of about 0.3 wt % to about 7 wt %, for example, about 0.5 wt % to about 3 wt % based on the total amount of the low elastic modulus layer 12b. When the low elastic modulus binder is used within the range, close contacting property with a positive current collector may be improved, and charge property of an electrode may be improved.

However, the low elastic modulus binder may decrease capacity density of the rechargeable lithium battery 1. Accordingly, the low elastic modulus layer 12b may be formed to be thin in view of increasing capacity density of the rechargeable lithium battery 1. When the low elastic modulus layer 12b is too thin, the positive active material layer 12 may not secure sufficient or suitable flexibility. Accordingly, the high elastic modulus layer 12a and the low elastic modulus layer 12b may have a thickness ratio, for example, a ratio of the thickness of the low elastic modulus layer to the thickness of the high elastic modulus layer, of about 0.2 to about 2.

The positive active material layer 12 may have at least an equivalent thickness to that utilized in the art for other rechargeable lithium batteries without a particular limit. For example, the low elastic modulus layer and the high elastic modulus layer may have a combined thickness at least equivalent to that utilized in the art for other rechargeable lithium batteries. According to one embodiment, the positive active material layer 12 has excellent flexibility and may be made to be thicker than (e.g., the low elastic modulus layer and the high elastic modulus layer may have a combined thickness that is thicker than) a positive active material layer utilized in the art for other rechargeable lithium batteries.

Hereinafter, an embodiment of a method of manufacturing a positive electrode 10 is described.

First, a high elastic modulus layer 12a is formed on a positive current collector 11. For example, a material of the high elastic modulus layer 12a is dispersed in an organic solvent or water to prepare an active mass slurry for a high elastic modulus layer, and the active mass slurry is coated on the positive current collector 11 to provide a coating layer.

Subsequently, a low elastic modulus layer 12b is formed on the high elastic modulus layer 12a before drying the coating layer. For example, a material of the low elastic modulus layer 12b is dispersed in an organic solvent or water to prepare an active mass slurry for a low elastic modulus layer, and the active mass slurry is coated on the high elastic modulus layer 12a to provide a two-layered coating layer.

Then, the coating layer is dried, and the low elastic modulus layer 12b is formed on the high elastic modulus layer 12a.

The coating method is not particularly limited, and may be, for example, a doctor blade method, a slot die method, a knife coater method, a gravure coater method, and/or the like.

Each coating process herein is not particularly limited, and the high elastic modulus layer and the low elastic modulus layer may concurrently (e.g., simultaneously) be coated, and/or the order of the foregoing acts may rearranged (e.g., switched or reversed).

The negative electrode 30 includes a current collector 31 and a negative active material layer 32 formed on the current collector 31.

The current collector 31 may include, for example, copper (Cu), nickel (Ni), and/or the like.

The negative active material layer 32 may be any suitable negative active material layer available in the art for a rechargeable lithium battery. For example, in some embodiments, the negative active material layer 32 includes a negative active material, and may further include a binder.

The negative active material may include one or more of a carbon-based material, a silicon-based material, a tin-based material, a lithium metal oxide, metal lithium, and/or the like. The carbon-based material may be, for example, a graphite-based material such as, for example, artificial graphite, natural graphite, a mixture of artificial graphite and natural graphite, natural graphite coated with artificial graphite, and/or the like. The silicon-based material may be, for example, silicon, silicon oxide, a silicon-containing alloy, a mixture of the graphite-based material with any of the foregoing materials, and/or the like. The silicon oxide may be represented by $SiO_x$ ($0<x\leq2$). The silicon-containing alloy is an alloy including silicon in a largest amount based on the total amount of the silicon-containing alloy (e.g., silicon is the predominant component of the silicon-containing alloy), and may be, for example, a Si—Al—Fe alloy. The tin-based material may be, for example, tin, tin oxide, a tin-containing alloy, a mixture of the graphite-based material with any of the foregoing materials, and/or the like. The lithium metal oxide may be, for example, a titanium oxide compound such as $Li_4Ti_5O_{12}$. According to one embodiment, the graphite may further improve cycle-life characteristics of the rechargeable lithium battery.

The binder may be polyvinylidene fluoride, an ethylene-propylene-diene terpolymer, a styrene-butadiene rubber (SBR), an acrylonitrile-butadiene rubber, a fluoroelastomer, polyvinyl acetate, polymethyl methacrylate, polyethylene, nitrocellulose, and/or the like.

The binder may not be particularly limited if it binds the negative active material and the conductive material on the current collector 21.

A content of the binder is not particularly limited, and may be any suitable content of a negative active material layer of a rechargeable lithium battery.

In some embodiments, the negative electrode 30 is manufactured as follows. A material of a negative active material layer is dispersed in an organic solvent or water to prepare a negative active mass slurry and the negative active mass slurry is coated on a current collector to form a coating layer. Then, the coating layer is dried. In the negative active mass slurry, a fluorine resin particulate and an elastomer-based polymer particulate may be dispersed and may be present in the resultant negative active material layer 10a. Then, the dried coating layer is compressed with a current collector 10b to manufacture a negative electrode 30.

The separator 20 is not particularly limited, and may be any suitable separator used for a rechargeable lithium battery. For example, a non-woven fabric or a porous film showing excellent high rate discharge performance and the like may be used alone or as a combination. As used herein, the terms "combination," "combination thereof," and "combinations thereof" may refer to a chemical combination (e.g., an alloy or chemical compound), a mixture, or a laminated structure of components.

For example, substrates of the separator may be formed of, for example, a polyolefin-based resin, a polyester-based resin, polyvinylidene fluoride (PVDF), a vinylidenefluoride-hexafluoropropylene copolymer, a vinylidenefluoride-perfluorovinylether copolymer, a vinylidenefluoride-tetrafluoroethylene copolymer, a vinylidenefluoride-trifluoroethylene copolymer, a vinylidenefluoride-fluoroethylene copolymer, a vinylidenefluoride-hexafluoroacetone copolymer, a vinylidenefluoride-ethylene copolymer, a vinylidenefluoride-propylene copolymer, a vinylidenefluoride-trifluoropropylene copolymer, a vinylidenefluoride-tetrafluoroethylene-hexafluoropropylene copolymer, a vinylidenefluoride-ethylene-tetrafluoroethylene copolymer, and/or the like. Examples of the polyolefin-based resin may be polyethylene, polypropylene, and/or the like, and examples of the polyester-based resin may be polyethylene terephthalate, polybutylene terephthalate, and the like.

The separator may be coated with an inorganic material of $Al_2O_3$, $Mg(OH)_2$, $SiO_2$, and/or the like.

A porosity of the separator is not particularly limited, and may have any suitable porosity of a separator of a rechargeable lithium battery.

The electrolyte may have a composition where an electrolytic salt is included in a non-aqueous solvent.

The non-aqueous solvent may be, for example, cyclic carbonates such as propylene carbonate, ethylene carbonate, butylene carbonate, chloroethylene carbonate, vinylene carbonate, and/or the like; linear carbonates such as dimethyl carbonate, diethyl carbonate, ethylmethyl carbonate, and/or the like; cyclic esters such as γ-butyrolactone, γ-valerolactone, and/or the like; linear esters such as methyl formate, methyl acetate, butyric acid methyl, and/or the like; tetrahydrofuran and/or a derivative thereof; ethers such as 1,3-dioxane, 1,4-dioxane, 1,2-dimethoxy ethane, 1,4-dibutoxyethane, methyl diglyme, and/or the like; nitriles such as acetonitrile, benzonitrile, and/or the like; dioxolane and/or a derivative thereof; ethylene sulfide, sulfolane, sultone and/or a derivative thereof which may be used singularly or as a mixture of two or more, without limitation.

The electrolytic salt may be, for example, an inorganic ion salt including lithium (Li), sodium (Na), and/or potassium (K), such as $LiClO_4$, $LiBF_4$, $LiAsF_6$, $LiPF_6$, $LiPF_{6-x}(CnF_{2n+1})_x$ ($1<x<6$, $n=1$ or $2$), $LiSCN$, $LiBr$, $LiI$, $Li_2SO_4$, $Li_2B_{10}Cl_{10}$, $NaClO_4$, $NaI$, $NaSCN$, $NaBr$, $KClO_4$, $KSCN$, and/or the like; an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_6)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phtalate, lithium stearyl sulfonate, lithium octyl sulfonate, lithium dodecylbenzene sulfonate, and/or the like. The ionic compounds may be used singularly or in a mixture of two or more.

A concentration of the electrolytic salt is not particularly limited, and may be for example, 0.5 mol/L to 2.0 mol/L.

The external material of the rechargeable lithium battery may include, for example, aluminum laminate and/or the like.

Hereinafter, an embodiment of a method of manufacturing the rechargeable lithium battery is described.

The positive electrode 10, the separator 20, the negative electrode 30 and the separator 20 are sequentially stacked to manufacture an electrode stack structure, and the electrode stack structure is wound to manufacture a winding element 1a. Subsequently, the winding element 1a is pushed down (e.g., compressed) to manufacture a flat winding element 1a. Then, the flat winding element 1a is inserted with a non-aqueous electrolyte into an exterior housing body, for example, a laminate film, and the exterior housing body is sealed to manufacture a rechargeable lithium battery 1. Herein, the terminal communicating electricity with each current collector is protruded out of the exterior housing body, when the exterior housing body is sealed.

According to one embodiment, the rechargeable lithium battery may be a stack-type (or stack-kind) of rechargeable lithium battery as well as a wound-type (wound-kind) of rechargeable lithium battery. For example, rechargeable lithium battery may be any suitable cylindrical, prismatic, laminate-type (laminate-kind), button type (button-kind), and/or the like.

Hereinafter, certain embodiments are illustrated in more detail with reference to examples. However, these examples are exemplary, and the present disclosure is not limited thereto. Furthermore, what is not described in this disclosure may be sufficiently understood by those who have knowledge in this field and will not be illustrated here.

Example 1

Manufacture of Positive Electrode

Lithium cobalt oxide, carbon black, and a vinylidenefluoride-tetrafluoroethylene (VdF-TFE) copolymer having a tensile modulus of 800 MPa as a high elastic modulus binder in a solid weight ratio of 97.6:1.2:1.2 were dissolved and dispersed in N-methyl-pyrrolidone, preparing an active mass slurry for a high elastic modulus layer. Subsequently, the active mass slurry was coated to be 12 μm thick on both sides of an aluminum foil as a current collector. Herein, the coating layer (for forming the high elastic modulus layer) had a thickness of 60 μm after the drying. Subsequently, the coating layer was dried to form a high elastic modulus layer on the current collector.

On the other hand, an active mass slurry for a low elastic modulus layer was prepared by dissolving and dispersing lithium cobalt oxide, carbon black and a mixture of vinylidenefluoride-tetrafluoroethylene (VdF-TFE) copolymer and a hydrogenated nitrile-butadiene rubber (H-NBR) as a low elastic modulus binder in a solid weight ratio of 97.6:1.2:1.2 in N-methyl-pyrrolidone. Herein, a tensile modulus of the low elastic modulus binder was 300 MPa.

Subsequently, the active mass slurry (for forming the low elastic modulus layer) was coated on the surface of the high elastic modulus layer. Herein, the coating layer (for forming the low elastic modulus layer) had a thickness of 60 μm after the drying. Subsequently, the coating layer was dried to form a low elastic modulus layer on the high elastic modulus layer. Herein, a thickness ratio of the high elastic modulus layer and the low elastic modulus layer was 1.

Then, the current collector and a positive active material layer (the high elastic modulus layer and the low elastic modulus layer) were compressed to manufacture a positive electrode. A thickness of the positive active material layer after the compression was 72 μm. In addition, a total thickness of the positive electrode was 156 μm and a density of the positive electrode was 4.15 g/cm$^3$.

Subsequently, an aluminum lead wire was welded at the terminal end of the positive electrode.

(Manufacture of Negative Electrode)

A negative active mass slurry was prepared by dissolving and dispersing graphite, styrene-butadiene rubber (SBR), and sodium salt of carboxylmethyl cellulose in a solid weight ratio of 98:1:1 in water. The negative active mass slurry was coated to be 6 μm thick on both sides of a copper foil as a current collector, dried, and compressed to form a negative active material layer, ultimately manufacturing a negative electrode. Herein, a total thickness of the negative electrode was 186 μm and electrode density of the negative electrode was 1.7 g/cm$^3$. Subsequently, a nickel lead wire was welded at the terminal end of the negative electrode.

(Manufacture of Winding Element)

The positive, a separator (ND314, ASAHI KASEI E-Materials Co.), and negative electrodes were sequentially stacked and then, wound in a length direction by using a wick having a diameter of 3 cm. After fixing the terminal end with a tape and removing the wick therefrom, a flat electrode winding element was manufactured by inserting the cylindrical electrode winding element between two sheets of 3 cm-thick metal plates and holding it for 3 seconds.

(Manufacture of Rechargeable Lithium Battery Cell)

The electrode winding element and an electrolyte solution along with a three polypropylene/aluminum/nylon-layered laminate film with two lead wires out were sealed under a reduced pressure, thereby manufacturing a rechargeable lithium battery cell.

Herein, the electrolyte solution was prepared by mixing ethylene carbonate and dimethyl carbonate in a volume ratio of 3:7 and dissolving 10 parts by weight of fluoroethylene carbonate (FEC) based on 100 parts by weight of the mixed solvent and 1.3 M LiPF$_6$ therein.

The rechargeable lithium battery cell was inserted between two sheets of 3 cm-thick metal plates heated up to 90° C. and held for 5 minutes.

Examples 2 to 9 and Comparative Examples 1 to 3

Rechargeable lithium battery cells were manufactured according to the same method as Example 1 except for changing the high elastic modulus binder and the low elastic modulus binder as shown in Table 1.

Comparative Example 4

Manufacture of Positive Electrode

Lithium cobalt oxide, carbon black, and polyvinylidene fluoride as a low elastic modulus binder in a solid weight ratio of 97.6:1.2:1.2 were dissolved and dispersed in N-methyl-pyrrolidone, preparing an active mass slurry for a low elastic modulus layer. Herein, a tensile modulus of the low elastic modulus binder was 300 MPa. Subsequently, the active mass slurry was coated on both sides of a 12 μm-thick aluminum foil as a current collector, forming a coating layer. A thickness of the coating layer was 60 μm after the drying. Subsequently, the coating layer was dried to form a low elastic modulus layer on the current collector.

On the other hand, an active mass slurry for a high elastic modulus layer was prepared by dissolving and dispersing lithium cobalt oxide, carbon black, and a mixture of vinylidenefluoride-tetrafluoroethylene (VdF-TFE) copolymer having a tensile modulus of 800 MPa and hydrogenated nitrile-butadiene rubber (H-NBR) as a high elastic modulus binder in a solid weight ratio of 97.6:1.2:1.2 in N-methylpyrrolidone.

Subsequently, the active mass slurry (for forming the high elastic modulus layer) was coated on the surface of the low elastic modulus layer, forming a coating layer. Herein, a thickness of the coating layer (for forming the high elastic modulus layer) was 60 μm after the drying. Subsequently, the coating layer was dried to form a high elastic modulus layer on the low elastic modulus layer. Herein, a thickness ratio of the low elastic modulus layer and the high elastic modulus layer was 1.

Then, the current collector and a positive active material layer (the low elastic modulus layer and the high elastic modulus layer) were compressed, thereby manufacturing a positive electrode. A thickness of the positive active material layer after the compression was 72 μm. In addition, a total thickness of the positive electrode was 156 μm and electrode density of the positive electrode was 4.15 g/cm$^3$.

Subsequently, an aluminum lead wire was welded at the terminal end of the positive electrode.

A rechargeable lithium battery cell was manufactured according to the same method as Example 1 except for using the positive electrode described with respect to Comparative Example 4 instead of using the positive electrode of Example 1.

Comparative Example 5

A rechargeable lithium battery cell was manufactured according to the same method as Comparative Example 4 except for changing the low elastic modulus binder and the high elastic modulus binder as shown in Table 1.

TABLE 1

| | Binder | | Tensile modulus (MPa) | | Ratio of two layers (thickness ratio of low elastic modulus layer/high elastic modulus layer) |
|---|---|---|---|---|---|
| | high elastic modulus binder (mixing weight ratio) | low elastic modulus binder (mixing weight ratio) | high elastic modulus binder | low elastic modulus binder | |
| Example 1 | VdF-TFE copolymer | VdF-TFE copolymer + H-NBR (8:2) | 800 | 300 | 1 |
| Example 2 | PVdF + H-NBR (5:1) | VdF-TFE copolymer | 700 | 400 | 1 |
| Example 3 | PVdF + H-NBR (8:1) | VdF-TFE copolymer + H-NBR (7:3) | 900 | 250 | 1 |
| Example 4 | VdF-TFE copolymer + H-NBR (9:1) | VdF-TFE copolymer + H-NBR (4:1) | 600 | 300 | 1 |
| Example 5 | PVdF | PVdF + H-NBR (5:3) | 1100 | 600 | 1 |
| Example 6 | PVdF | VdF-TFE copolymer + H-NBR (4:1) | 1100 | 300 | 1 |
| Example 7 | VdF-TFE copolymer + H-NBR (7:1) | H-NBR | 450 | 200 | 1 |
| Example 8 | VdF-TFE copolymer + H-NBR (9:1) | H-NBR | 600 | 200 | 0.25 |
| Example 9 | PVdF | VdF-TFE copolymer + H-NBR (4:1) | 1100 | 300 | 1.5 |
| Comparative Example 1 | PVdF | None | 1100 | — | — |
| Comparative Example 2 | VdF-TFE copolymer | None | 800 | — | — |
| Comparative Example 3 | H-NBR | None | 200 | — | — |
| Comparative Example 4 | VdF-TFE copolymer + H-NBR (6:1) | PVdF | 400 | 1100 | 1 |
| Comparative Example 5 | H-NBR | PVdF | 200 | 1100 | 1 |

In Table 1, a mole ratio between VdF:TFE of the VdF-TFE copolymer was 90:10 of and a weight average molecular weight of the VdF-TFE copolymer was 700,000.

A weight average molecular weight of the PVdF was 650,000.

In Table 1, the tensile modulus was measured according to a tensile test according to ASTM D638.

Evaluation 1: Bending Test of Positive Electrode

When each positive electrode according to Examples 1 to 9 and Comparative Examples 1 to 5 was bent by using a MIT-type folding endurance tester made by Yasuda Seiki Seisakusho, Ltd. and then, broken, a load (N) applied to the positive electrode was recorded, and the results are provided in Table 2.

Evaluation 2: Cycle-Life Test of Rechargeable Lithium Battery Cell

A rechargeable lithium battery cell was CC-CV (constant current constant voltage) charged at 0.1 C up to a voltage of 4.4 V and CC (constant current) discharged at 0.1 C down to a voltage of 2.75 V at the first cycle. Subsequently, the rechargeable lithium battery cell was CC-CV charged at 0.2 C up to a voltage of 4.4 V and CC discharged at 0.2 C down to a voltage of 2.75 V at the 2nd cycle. In addition, the rechargeable lithium battery cell was repetitively CC-CV charged at 1.0 C up to a voltage of 4.4 V and CC discharged at 1.0 C down to 3.00 V after the 3rd cycle.

Capacity retention was obtained by dividing discharge capacity at the 300th cycle by discharge capacity at the 3rd cycle, and the results are provided in Table 2.

TABLE 2

|  | Bending test (N) | Capacity retention (%) |
| --- | --- | --- |
| Example 1 | 7 | 86 |
| Example 2 | 7 | 87 |
| Example 3 | 7 | 83 |
| Example 4 | 8 | 82 |
| Example 5 | 5 | 87 |
| Example 6 | 6 | 87 |
| Example 7 | 8 | 80 |
| Example 8 | 6 | 82 |
| Example 9 | 7 | 85 |
| Comparative Example 1 | 2 | Non-measureable |
| Comparative Example 2 | 3 | Non-measureable |
| Comparative Example 3 | 10 | 20 |
| Comparative Example 4 | 3 | Non-measureable |
| Comparative Example 5 | 4 | Non-measureable |

Table 2 shows the positive electrodes according to Comparative Examples 1, 2, 4, and 5 were broken during the manufacture of a winding element, and thus their capacity retentions were not able to be evaluated.

Referring to Table 2, the positive electrodes of Examples 1 to 7 showed a larger load when broken and thus had higher flexibility than the positive electrodes of Comparative Examples 1, 2, 4, and 5. In addition, Examples 1 to 7 showed excellent cycle characteristics. Comparative Example 3 showed excellent flexibility compared with Examples 1 to 7 but much deteriorated cycle characteristics.

Accordingly, Examples 1 to 7 showed excellent cycle characteristics and concurrently (e.g., simultaneously), improved flexibility of a positive active material layer. As for Comparative Examples 1 to 3, since only a high elastic modulus layer or a low elastic modulus layer was used to form a positive active material layer, a winding element was not manufactured, or cycle characteristics were largely deteriorated. In addition, when a low elastic modulus layer was not formed on a high elastic modulus layer according to Comparative Examples 4 and 5, a desired effect was not obtained.

In addition, Examples 1 to 4 showed satisfactory or suitable results compared with Examples 5 to 7, due to the high elastic modulus binder having a tensile modulus of 500 MPa to 900 MPa, and concurrently (e.g., simultaneously), a low elastic modulus binder having a tensile modulus of 200 MPa to 500 MPa.

In this way, a rechargeable lithium battery cell according to one embodiment may maintain cycle characteristics and improve flexibility of a positive active material layer, and as a result, the positive active material layer may be made much thicker.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the FIGURES. It will be understood that the spatially relative terms are intended to encompass different orientations of the device in use or in operation, in addition to the orientation depicted in the FIGURES. For example, if the device in the FIGURES is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims, and equivalents thereof.

DESCRIPTION OF SOME OF THE SYMBOLS

1 rechargeable lithium battery
1*a* winding element
10 positive electrode
11 positive current collector
12 positive active material layer
12*a* high elastic modulus layer
12*b* low elastic modulus layer
20 separator
30 negative electrode
31 negative current collector
32 negative active material layer

What is claimed is:

1. A positive electrode for a rechargeable lithium battery comprising:
   a positive current collector;
   a high elastic modulus layer on the positive current collector and comprising a first positive active material and a high elastic modulus binder; and
   a low elastic modulus layer positioned on the high elastic modulus layer and comprising a second positive active material and a low elastic modulus binder,
   wherein the low elastic modulus layer is positioned on the high elastic modulus layer that is on the positive current collector in that order, and
   wherein the low elastic modulus binder has lower tensile modulus than the high elastic modulus binder.

2. The positive electrode of claim 1, wherein the high elastic modulus binder has a tensile modulus of about 400 MPa to about 1200 MPa.

3. The positive electrode of claim 1, wherein the low elastic modulus binder has a tensile modulus of about 150 MPa to about 700 MPa.

4. The positive electrode of claim 1, wherein at least one selected from the high elastic modulus binder and the low elastic modulus binder comprises a copolymer.

5. The positive electrode of claim 1, wherein at least one selected from the first positive active material and the second positive active material comprises a lithium transition metal oxide.

6. A winding element comprising the positive electrode of claim 1.

7. A rechargeable lithium battery comprising the winding element of claim 6.

* * * * *